Sept. 6, 1966   R. E. GELLER   3,270,581
STEERING WHEEL CONSTRUCTION
Filed Oct. 23, 1963   5 Sheets-Sheet 1

INVENTOR.
RODGER E. GELLER
BY
ATTORNEY

Sept. 6, 1966  R. E. GELLER  3,270,581
STEERING WHEEL CONSTRUCTION
Filed Oct. 23, 1963  5 Sheets-Sheet 2
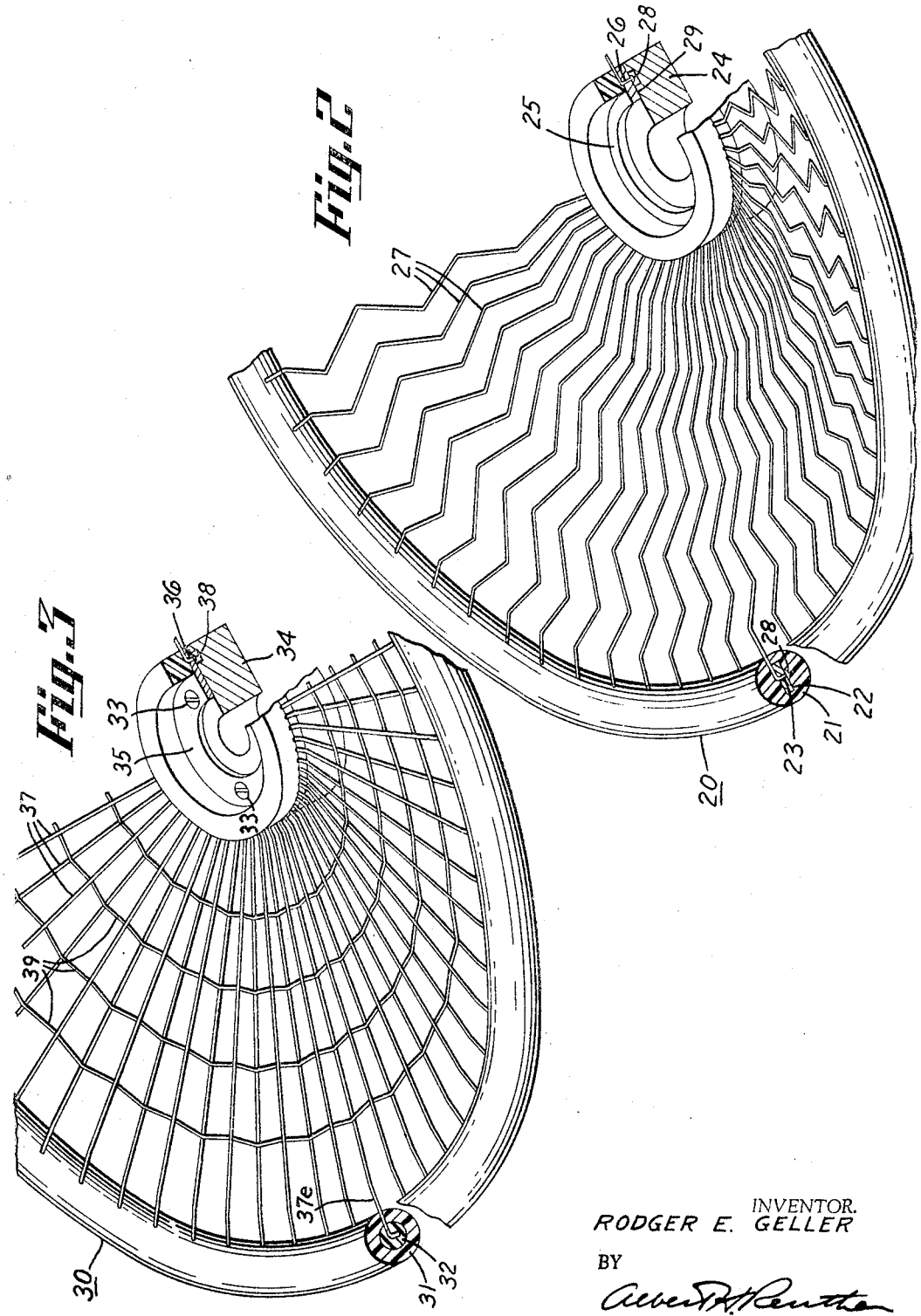
INVENTOR.
RODGER E. GELLER
BY
Albert H. Reuther
ATTORNEY

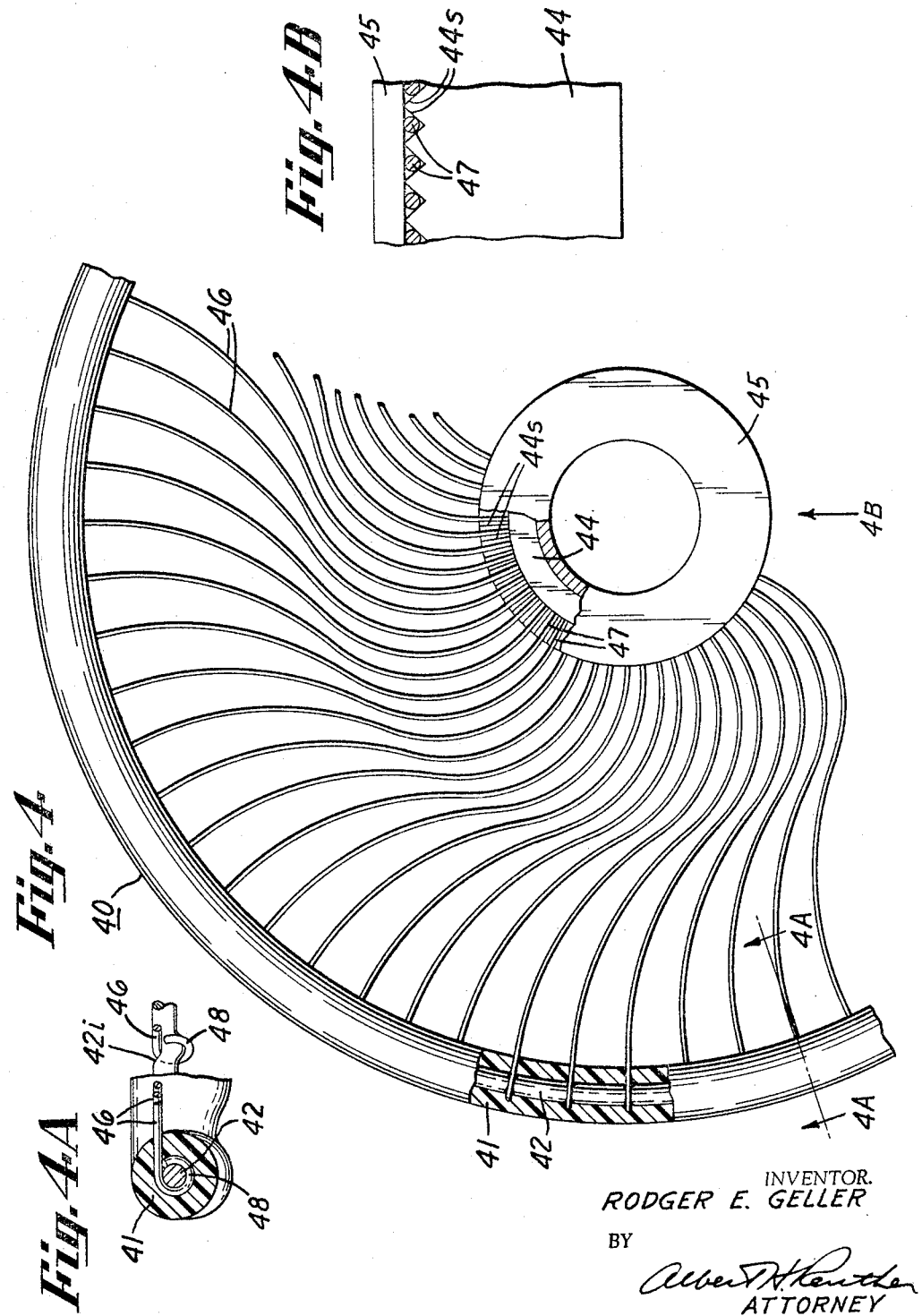

Sept. 6, 1966   R. E. GELLER   3,270,581
STEERING WHEEL CONSTRUCTION
Filed Oct. 23, 1963   5 Sheets-Sheet 4
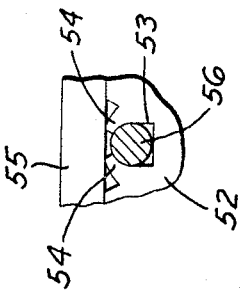
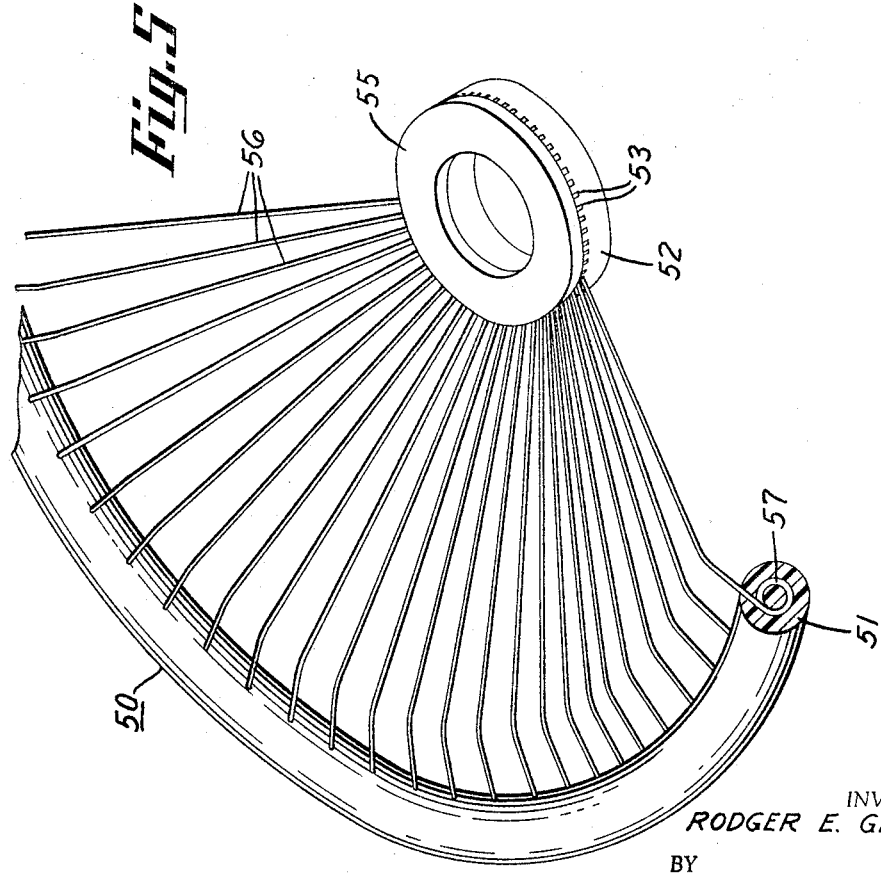
INVENTOR.
RODGER E. GELLER
BY
ATTORNEY Sept. 6, 1966   R. E. GELLER   3,270,581
STEERING WHEEL CONSTRUCTION
Filed Oct. 23, 1963   5 Sheets-Sheet 5
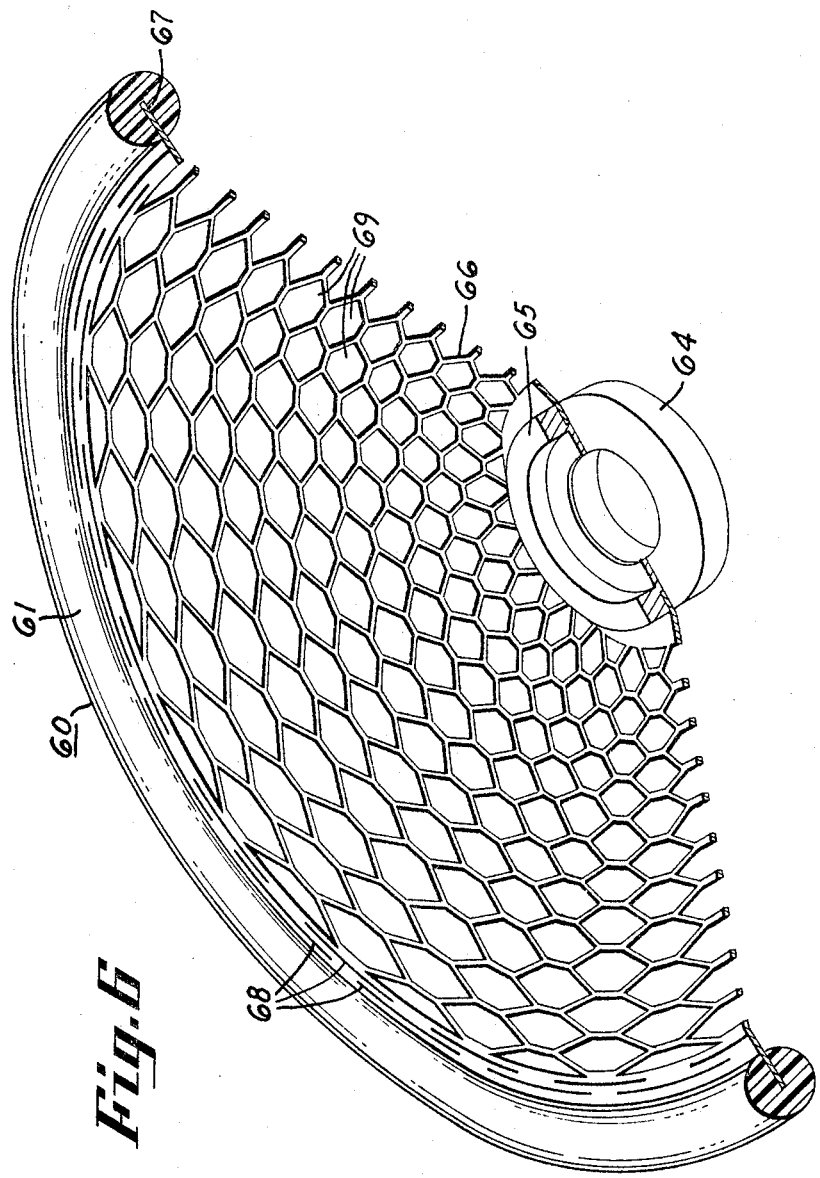
INVENTOR.
RODGER E. GELLER
BY
*Albert H. Reuther*
ATTORNEY

United States Patent Office 3,270,581
Patented Sept. 6, 1966

3,270,581
STEERING WHEEL CONSTRUCTION
Rodger E. Geller, Dayton, Ohio, assignor to General Motors Corporation, Detroit, Mich., a corporation of Delaware
Filed Oct. 23, 1963, Ser. No. 318,207
7 Claims. (Cl. 74—552)

This invention relates to vehicle steering wheels, and more particularly, to fabrication thereof having safety features for protection under bodily impact.

An object of this invention is to provide steering wheel means having hub-spoke-rim construction capable of more acceptable energy absorption per se under bodily impact for greater safety yet strong enough to withstand all operating torque requirements in a vehicle.

Another object of this invention is to provide steering wheel structure including a centrally located hub portion and peripherally extending rim portion interconnected exclusively by plural zig-zag stepped wiring means provided in a continuous configuration for resilience during turning movement as well as under bodily impact.

Another object of this invention is to provide steering wheel structure including a centrally located hub portion and peripherally extending rim portion interconnected by a basket configuration of radially extending wiring interwoven with further continuous wiring ring means substantially concentrically to each other as well as to the rim and hub portions.

Another object of this invention is to provide steering wheel structure including a centrally located hub portion and peripherally extending rim portion interconnected by a basket configuration of slitted, perforated and expanded metal continuous throughout.

A further object of this invention is to provide construction on a steering wheel means including wiring that interconnects a plastic rim portion and a central hub portion adapted to receive wiring ends in a serrated edging over which a covering with fastening is added, in radial hub recesses crimped inwardly over the wiring ends as well as optional welding of wiring ends thereto.

A still further object of this invention is to provide construction on a steering wheel means including wiring that interconnects a central hub portion and a rim portion having an outer plastic covering over a central core portion of a differing plastic material, of irregularly shaped metal chain-like-type configuration, or of a continuous metal ring perforated to be engaged by outer ends of the wiring.

Further objects and advantages of the present invention will be apparent from the following description, reference being had to the accompanying drawings wherein preferred embodiments of the present invention are clearly shown.

In the drawings:

FIGURE 1 provides a perspective illustration of steering wheel means partially sectioned to show features in accordance with the present invention.

FIGURE 2 is a fragmentary perspective view of another steering wheel means structure in accordance with the present invention.

FIGURE 3 shows another embodiment of the present invention in a fragmentary perspective view.

FIGURE 4 represents still a further embodiment of hub and rim portion fastening of wiring on steering wheel means in accordance with the present invention.

FIGURE 4A is a sectional view taken along line 4A—4A in FIGURE 4.

FIGURE 4B is an enlarged fragmentary side view taken in direction of arrow 4B in FIGURE 4.

FIGURE 5 represents another embodiment of hub and rim portion fastening of wiring on steering wheel means in accordance with the present invention.

FIGURE 5A is an enlarged fragmentary side view of the hub portion of FIGURE 5.

FIGURE 6 is a fragmentary perspective view of steering wheel means having hub and rim portions interconnected by a slitted, perforated and expanded metal continuous though basket-shaped intermediate portion therebetween.

Figure 1:
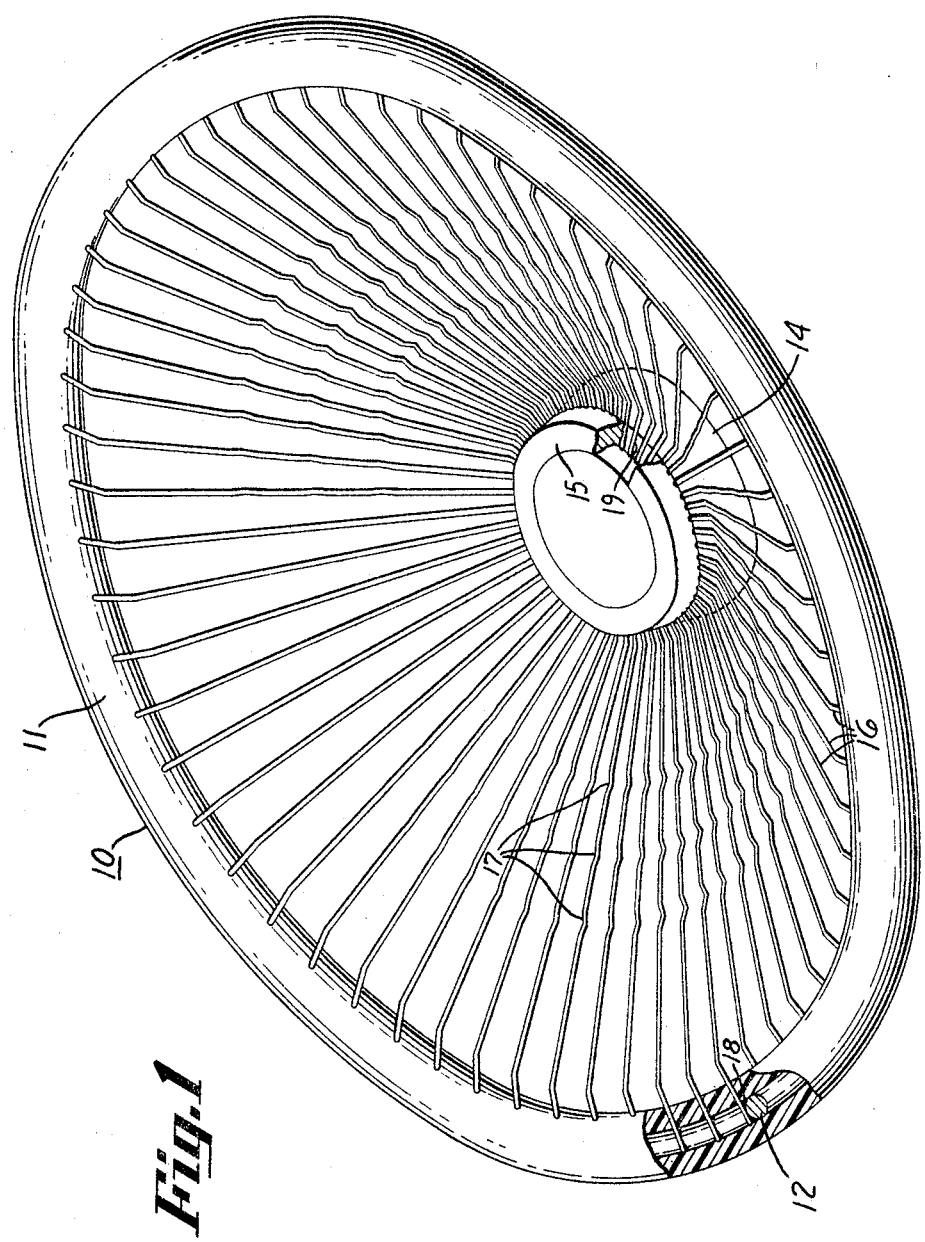

In FIGURE 1 there is shown a steering wheel means generally indicated by numeral 10 having an outer rim portion including a plastic covering 11 and an annular metal insert 12. Located radially and substantially concentrically inwardly from this rim portion there is a central hub portion 14 having a covering 15 thereon. The hub portion 14 can be made of metal also. In accordance with the present invention wiring means 16 provided with intermittent steps or angular displaced portions 17 can be provided to interconncet the hub and rim portions. Opposite ends of the wiring means 16 can be secured to the metal insert or annular rod 12 by a weld 18 and to a hub portion upper surfacing by a weld 19 as indicated in FIGURE 1. It is to be noted that by using a multiplicity of small wiring means emerging radially between the hub and rim portions it is possible to eliminate relatively thick or heavy spokes or rods previously utilized in only isolated locations. The spoke means 16 are individually flexible per se though they can be provided with laterally offset opposite ends for joining between the rim and hub portions into a deep dish or wire basket configuration. Each of the wiring means 16 can be made of a stainless steel or brushed chrome material which provides not only structural advantage but also facilitates viewing of a dashboard or instrument panel on an opposite side thereof. The wiring means per se can be finished to have surfacing thereof free of reflection and glare. A brushed outer surfacing of the wires can have a pleasing satin-like finish which collectively affords a relatively unconventional though highly acceptable steering wheel construction.

In FIGURE 2 there is illustrated a fragmentary view of another steering wheel means generally indicated by numeral 20 having a rim portion with plastic outer covering 21 and an annular metal insert 22 having apertures 23 therethrough. A centrally located hub portion 24 and cover or retainer plate 25 can also be provided with apertures 26. Continuous zig-zag wiring means 27 can have opposite headed ends 28 thereof fitted to the apertured insert means 22 and retainer plate 25. A fastening 29 such as a weld in a spot-like location at predetermined points radially around the hub portion 24 can be used to hold the cover or retainer plate 25 in place. The hub portion 24 can have a continuous annular recess into which headed ends 28 of the zig-zag wiring means 27 can be accommodated subject to closure by the covering or retainer plate portion 25.

The zig-zag wiring means 27 have a herring bone type appearance and individual legs or segments forming the zig-zag configuration can be substantially parallel to each other subject to radial positioning thereof into a resilient construction so far as turning or torque requirements are concerned and also so far as bodily impact is concerned. The wiring means 27 having the zig-zag configuration can also have a brushed metal surfacing and again enhance viewing of an instrument panel or transparent area such as a windshield location.

In FIGURE 3 there is shown a fragment of a steering wheel means generally indicated by numeral 30 including an outer plastic covering 31 and an inner plastic core portion 32 of differing resilience and strength such that the inner plastic core 32 extends in a continuous annular configuration. Suitable fastening means such as screws 33 can be threaded to a central hub portion 34 thereby holding a cover or retainer plate means 35 therewith. The cover or retainer plate means 35 can have apertures 36 through which radially expanding wiring means 37 can be fitted to have an enlarged head ending 38 thereof located in an annular recess 34 of the hub portion 34. Outer ends 37e of the wiring means 37 are imbedded directly in the plastic core means 32 which is for ductility though sufficiently strong to provide a base for the more brittle decorative-type plastic covering 31. The ductile plastic core 32 is a sub-assembly completely encased by the covering 31. Further in accordance with the present invention the wiring means 37 have interwoven or interlaced wiring ring means 39 substantially concentric to each other and spaced substantially evenly intermediate the hub portion 34 and rim portion 31–32. The interwoven or interlaced wiring ring means 39 contribute to a basket configuration and aid in maintaining radially expanding positioning of the wiring 37. The core portion 32 provides an outer circular reinforcement as is true also for the wiring ring means 39. Ends 37e of the wiring 37 can be bent laterally in a direction away from the driver's side of the steering wheel means 30.

It is to be noted that the wiring means 16 having angular steps 17 will have a rate of collapse differing from that of the continuous zig-zag wiring means 27 as well as differing from that of the wiring means 37 interlaced or interwoven with ring means 39. Still further variation in the rate of collapse and construction of a steering wheel means 40 of FIGURE 4 can be realized by providing additional features in accordance with the present invention. The steering wheel means 40 includes a plastic rim portion 41 having a metal insert means 42 having periodic inward offsets 42i as shown in FIGURE 4A. The rim portion is located upwardly from a hub portion 44 having a serrated peripheral edging 44S subject to addition of a covering plate 45 which can be secured thereto by welding or screws. A multiplicity of small wiring means 46 can be provided in a spiral configuration with radially inner ends 47 of the wiring means 46 being fitted complementary to the serrated peripheral edging 44S of the hub portion 44 as shown in FIGURE 4B. The cover or plate portion 45 can engage these wiring ends 47 held thereby in V-shaped grooves of the serrated portion or edging 44S. Radially outer ends of the wiring means 46 can have a looped or J-shape 48 coinciding with the inward offsets 42i for anchoring thereof in predetermined radially expanded positioning as to the metal insert or core 42. It is to be understood that the spiral configuration of the wiring means 46 provides a deep-dish contouring while simultaneously providing an intermediate connection between the hub and rim portions.

A steering wheel means generally indicated by numeral 50 in FIGURE 5 includes a plastic rim portion 51 and a central hub portion 52. Hub portion 52 as shown best in FIGURE 5A has radial notches or recesses 53 therein subject to crimping or staking of opposite bars or edges 54 thereof. A covering 55 or retainer plate can be added to hide the crimping or staking of bar edges 54. This staking or crimping of the ends of wiring means such as 56 could be used for the wiring means shown in views of FIGURES 1 through 4 inclusive. Outer ends 57 of the wiring means 56 can be formed into a closed loop embedded per se in the plastic material of the rim portion 51 which can have sufficient strength per se to require no further core or central reinforcing insert means.

In FIGURE 6 there is shown a steering wheel means generally indicated by numeral 60 including an outer rim portion of plastic material 61 as well as a central hub portion 64 having a cover plate 65 secured thereto. An intermediate basket portion 66 can have an outer edging 67 embedded in the rim portion 61 of plastic material. This basket portion 66 can include slits 68 and openings or perforation 69 in an expanded-metal dish-shaped configuration resulting from snapping or deformation thereof between suitable die parts. It is to be understood that an inner peripheral annular edging can be retained between the hub portion 64 and covering 65 thereof. Such inner annular edging could be welded or otherwise secured to the hub portion 64 if necessary. The perforations or expanded metal configuration result from provision of the slits 68 which are opened or expanded during basket or dish formation of the intermediate expanded portion 66 in accordance with the present invention on a steering wheel means 60. This expanded metal portion 66 can be provided with a satin-like metal finishing and the openings or perforations 69 decrease weight of the intermediate portion and also permit viewing therethrough as well as predetermined flexibility.

It is to be noted that the plastic covering or rim portions illustrated in views of FIGURE 1 through 6 inclusive can be vapor finished in accordance with a method of polishing and deflashing of molded plastic articles covered by United States Patent 3,020,661—Miller et al. issued February 13, 1962, and belonging to the assignee of the present invention. Also, it is to be noted that the wiring means shown in views of FIGURES 1 through 5 inclusive can be provided with a round cross section as well as a square or rectangular cross section per se or even a multi-facet polygonal configuration in the cross section per se. Thus, the radial recesses 53 shown in FIGURE 5 can be made to have a configuration to accommodate and complement such wiring cross section per se or can be made substantially rectangular or square to receive any of the differing cross sections of wiring means per se which may be used. The hub portions can be made of cast metal and the expanded metal insert can be a preformed dish-shaped stamping. Rolled metal stock can also be used for the wiring means and it is to be noted also that the rim portion need not be annular but could also have an irregular shape though using the wiring means between the hub and rim portions in accordance with the present invention. It is also to be understand that the plastic material of the rim portion can be provided with a simulated grained or wood-like appearance. Such material is made available under a trade name "S-A-F" wood by the assignee of the present invention. This "S-A-F" wood plastic material is so identified from terminology "synthetic applied finish" usable for producing steering wheel rim portions having wood-like appearance though such appearance is on the surfacing only, and the rim portion is plastic material throughout.

It is to be noted that the wiring means such as shown in views of FIGURES 1 through 4 for example are to be spaced apart radially away from each other along the rim portion therewith such that space therebetween will permit fingers from the hands of a vehicle operator to fit therebetween. Thus, it is possible to avoid need for molding finger recesses along an underside or inner periphery of the rim portion. The wiring means will serve this purpose simultaneously with the interconnecting of the rim and hub portions accomplished thereby. It is also to be understood that the wiring means can be provided supplemental to more rigid solid spokes totalling between one and three in number though located along an underside of the wiring means of the steering wheel in a position remote from the operator seated adjacent to the steering wheel means. Such rigid spokes or rods can thus be placed farther away from the operator and the wiring means will absorb the shock or impact of an object or body due to sudden collision and the like. Reference can be made to a United States Patent 2,946,869—Parks et al. on a safety steering wheel and horn blowing means issued July 26, 1960, and belonging to the assignee of the present invention for a dual spoke wheel arrangement having considerable open space which can be filled by the wiring means structurally arranged in accordance with the present invention and adapted to supplement the heavier spokes or rods.

FIGURE 6 of the drawings shows an expanded metal intermediate portion per se provided with open areas such that the expanded metal in effect serves as a spokes means per se leaving the open areas therebetween for viewing an instrument panel and to enhance finger gripping possibilities for engaging the rim portion of such steering wheel means. The rim portion of such steering wheel means utilizing expanded-metal resulting from circular slits 68 in quadrants, thirds or other limited segments of the steering periphery can be provided with a multi-plastic rim portion having brittle plastic covering over more ductile plastic core portions as noted earlier and/or provided with a metal reinforcing means or metal core embedded in the rim portion. The isolated radially extending metal portions can then be suitably joined such as by welding to the metal reinforcing core, if provided, and also to the metal hub portion fitted with a covering thereon.

The rim portion can have annular as well as rectangular and/or irregularly squared configuration. The expanded metal intermediate portion can be conical per se as well as combined with central horn blowing actuation. The opening 69 can be round, irregular, diamond and otherwise in configuration. Further reference can be made to design applications co-pending herewith and now Design Patents D-200,636—Geller issued March 23, 1965, D-202,495—Geller issued October 12, 1965, as well as co-pending divisions thereof now including Design Patents D-202,183—Geller issued September 7, 1965, and D-202,420—Geller, D-202,421—Geller, D-202,422—Geller, D-202,423—Geller, all issued September 28, 1965, and D-203,390—Geller, D-203,389—Geller, both issued January 4, 1966, for variations in appearance with a notation that wiring per se can have a round, squared, hexagonal and other irregular cross section with shiny as well as brushed or patterned outer finish surfacing depending upon appearance effects sought.

While the embodiments of the present invention as herein disclosed constitute preferred forms, it is to be understood that other forms might be adopted.

What is claimed is as follows:

1. Steering wheel structure, comprising a rim portion, multiple wiring means extending radially and axially offset to one side from said rim portion, and a central hub portion having a covering thereon, said hub portion including a specific continuous radially serrated edging that receives inner ends of said wiring means in equally spaced and uniformly distributed intervals rather than in isolated clusters subject to fitting of said covering thereto.

2. Steering wheel structure, comprising a rim portion, multiple wiring means extending radially and offset axially inwardly from said rim portion, and a central hub portion having a covering thereon, said hub portion having radially located recessing to receive inner ends of said wiring means subject to fitting of said covering tightly thereto, said multiple wiring means having location in equally spaced and uniformly distributed intervals rather than in isolated clusters.

3. Steering wheel structure, comprising a central hub portion, a multiplicity of wiring means expanding radially and axially offset from said hub portion, and a rim portion including both an inner plastic core of relatively ductile material to anchor outer substantially J-shaped hook ends of said wiring means therein at uniformly spaced arcuate intervals, and an outer covering thereon of relatively brittle plastic trim material.

4. The structure of claim 3 wherein said wiring means extend radially in continuously swirling and spiral configuration collectively having an axially offset basket shape.

5. On a steering wheel means including a central hub portion having a covering thereon and a rim portion spaced outwardly therefrom, the combination therewith comprising an expanded metal intermediate portion having perforations for resilience throughout with radially opposite edging of the expanded metal intermediate portion junctures in said hub and rim portions, said expanded metal intermediate portion having substantially diamond-shaped perforations therethrough that result from axial displacement of expanded metal into a basket dish-shaped configuration provided by said expanded metal intermediate portion.

6. On a steering wheel means including a central hub portion having a covering thereon and a rim portion spaced outwardly therefrom, the combination therewith comprising an expanded metal intermediate portion having perforations for resilience throughout with radially opposite edging of the expanded metal intermediate portion junctures in said hub and rim portions, said expanded metal intermediate portion having substantially diamond-shaped perforations therethrough that initially were slits in concentric circular location and caused to increase in opening thereof due to axially offset deformation of said expanded metal intermediate portion into a basket configuration fitting between said hub and rim portions.

7. Steering wheel construction, comprising a central hub portion having a covering thereon, a rim portion spaced outwardly therefrom, and a multiplicity of zig-zag wiring means interconnecting said rim and hub portions each having intermediate and complementary offset angular displacement for resilience therebetween as a safely collapsible protection against bodily harm under impact, said zig-zag wiring means with intermediate angular displacement expanding radially in segments substantially complementary and parallel to each other in peripheral positions around said hub portion and being offset axially to one side of said rim portion.

References Cited by the Examiner

UNITED STATES PATENTS

| | | | |
|---|---|---|---|
| D. 200,636 | 3/1965 | Geller | D14—30 |
| 782,877 | 2/1905 | Roney | 74—552 X |
| 846,695 | 3/1907 | Reed | 74—552 X |
| 1,113,577 | 10/1914 | Redfield | 301—55 |
| 1,475,602 | 11/1923 | Sheller | 74—552 X |
| 1,716,856 | 6/1929 | Kidd | 74—552 |
| 1,720,737 | 7/1929 | Lambert | 74—552 |
| 2,156,476 | 5/1939 | Husted | 74—552 |
| 2,179,013 | 11/1939 | Kaye | 74—552 |
| 2,184,800 | 12/1939 | Husted | 74—552 |

FOREIGN PATENTS

| | | |
|---|---|---|
| 623,212 | 3/1927 | France. |
| 436,411 | 10/1935 | Great Britain. |

FRED C. MATTERN, JR., *Primary Examiner.*

BROUGHTON G. DURHAM, *Examiner.*

C. F. GREEN, *Assistant Examiner.*